(12) United States Patent
Cho et al.

(10) Patent No.: US 8,166,930 B2
(45) Date of Patent: May 1, 2012

(54) VARIABLE COMPRESSION RATIO APPARATUS

(75) Inventors: Myung Rae Cho, Incheon (KR); Hong Wook Lee, Yongin (KR); Woo Tae Kim, Suwon (KR); Won Gyu Kim, Seoul (KR); Jin Woo Cho, Seongnam (KR)

(73) Assignee: Hyundai Motor Company, Seoul (KR)

( * ) Notice: Subject to any disclaimer, the term of this patent is extended or adjusted under 35 U.S.C. 154(b) by 412 days.

(21) Appl. No.: 12/511,633

(22) Filed: Jul. 29, 2009

(65) Prior Publication Data

US 2010/0132671 A1 Jun. 3, 2010

(30) Foreign Application Priority Data

Dec. 2, 2008 (KR) .................. 10-2008-0121487

(51) Int. Cl.
*F02B 75/04* (2006.01)
(52) U.S. Cl. ............... 123/48 B; 123/48 R; 123/48 A; 123/78 R; 123/78 BA
(58) Field of Classification Search ........... 123/48 R, 123/48 A, 48 AA, 48 B, 78 R, 78 A, 78 AA, 123/78 E, 78 F, 197.4, 197.3
See application file for complete search history.

(56) References Cited

U.S. PATENT DOCUMENTS

| | | | | |
|---|---|---|---|---|
| 1,572,918 A * | 2/1926 | Geddes | ............................. | 74/45 |
| 1,909,372 A * | 5/1933 | McCollum et al. | ......... | 123/48 B |
| 2,873,611 A * | 2/1959 | Biermann | ......................... | 74/40 |
| 5,163,386 A * | 11/1992 | Schechter | .................. | 123/48 B |
| 2007/0169739 A1* | 7/2007 | Meyer et al. | ............... | 123/197.4 |

FOREIGN PATENT DOCUMENTS

JP 2002-155769 A 5/2002
* cited by examiner

*Primary Examiner* — Noah Kamen
*Assistant Examiner* — Hung Q Nguyen
(74) *Attorney, Agent, or Firm* — Morgan, Lewis & Bockius LLP

(57) ABSTRACT

A variable compression ratio apparatus for varying a compression ratio, may include a connecting rod that is connected to a piston to take a combustion force; a pin link, one end of which is eccentrically connected to a crankshaft and the other end of which is pivotally connected to the connecting rod to form a connection portion therebetween; a slot link including a control slot to receive and guide the connection portion along the control slot; and a driving unit coupled to the slot link and configured to move the control slot to control a position of the connection portion.

20 Claims, 9 Drawing Sheets

VARIABLE COMPRESSION RATIO APPARATUS

CROSS-REFERENCE TO RELATED APPLICATION

The present application claims priority to Korean Patent Application No. 10-2008-0121487 filed on Dec. 2, 2008, the entire contents of which are incorporated herein for all purposes by this reference.

BACKGROUND OF THE INVENTION

1. Field of the Invention

The present invention relates to a variable compression ratio apparatus. More particularly, the present invention relates to a variable compression ratio apparatus that varies the compression ratio of a mixed gas inside a combustion chamber according to driving conditions of an engine.

2. Description of Related Art

A variable compression ratio (VCR) apparatus varies the compression ratio of a mixed gas corresponding to operating conditions of an engine. According to the variable compression ratio apparatus, the compression ratio of the mixed gas is raised to decrease fuel consumption in a low load condition of the engine, and the compression ratio of the mixed gas is lowered to prevent "knocking" and to improve the output thereof in a high load condition of the engine.

The conventional variable compression ratio apparatus describes a multi-link type of control means that includes a connecting rod, which is connected to a piston to receive the explosion force of the mixed gas, and a pin link, which receives the explosion force from the connecting rod to rotate the crankshaft, to vary the rotation track of the pin link according to the driving condition of the engine such that the compression ratio of the mixed gas can be varied.

However, in the conventional variable compression ratio apparatus having a multi-link type of control means, a journal portion for mounting the control shaft is formed inside the crankcase of a cylinder block, and so on, so there is a drawback that the structure thereof is complicated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a variable compression ratio apparatus for varying a compression ratio in which the structure thereof is simple and compact.

In an aspect of the present invention, the variable compression ratio apparatus for varying a compression ratio, may include a connecting rod that is pivotally connected to a piston to take a combustion force, a pin link, one end of which is eccentrically connected to a crankshaft and the other end of which is pivotally connected to the connecting rod to form a connection portion therebetween, a slot link including a control slot to receive and guide the connection portion along the control slot, and a driving unit coupled to the slot link and configured to move the control slot to control a position of the connection portion.

The control slot may have an arc shape of a predetermined curvature.

In another aspect of the present invention, the driving unit may include a hydraulic pressure cylinder to receive an operating rod therein, one side of the slot link being pivotally fixed to the crankcase, a rear end of the hydraulic pressure cylinder being pivotally fixed to the crankcase, and a front end of the operating rod being pivotally connected to the other side of the slot link.

In another aspect of the present invention, the driving unit may include a motor mounted to the crankshaft, and a pinion being connected to a rotation shaft of the motor, wherein one side of the slot link is pivotally connected to the crankcase and a rack portion is formed in the other side of the slot link such that the pinion is engaged with the rack portion of the slot link.

In further another aspect of the present invention, the driving unit may include a motor being mounted in the crankcase, an eccentric cam being mounted to a rotation shaft of the motor, and a link, wherein a cam ring, through which the eccentric cam is inserted, is configured on one end of the link and the other end of the link is pivotally connected to one side of the slot link and the other side of the slot link is pivotally connected to the crankcase In another aspect of the present invention, the driving unit may include a motor that is mounted in the crankcase and one side of the slot link being fixed to a rotation shaft of the motor.

In further another aspect of the present invention the driving unit may include a vane type of a hydraulic pressure actuator, and one side of the slot link is fixed to a center shaft of the hydraulic pressure actuator and is provided with hydraulic pressure to rotate the slot link at a predetermined angle.

In still further another aspect of the present invention the driving unit may include two hydraulic pressure cylinders having operating rods respectively, rear ends of which are pivotally connected to one portion and the other portion of the crank case respectively, and front ends of each operating rod are pivotally connected to one portion and the other portion of the slot link respectively.

In various aspect of the present invention, the variable compression ratio apparatus includes a connecting rod, a pin link, a slot link having a control slot, and a driving unit to be mounted in the crankcase without a size increase of the crankcase such that the compression ratio of the mixed gas is varied corresponding to driving conditions of the engine to improve the output and fuel efficiency thereof.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

The various embodiments of the present invention will be described more fully hereinafter with reference to the accompanying drawings.

Figure 1:
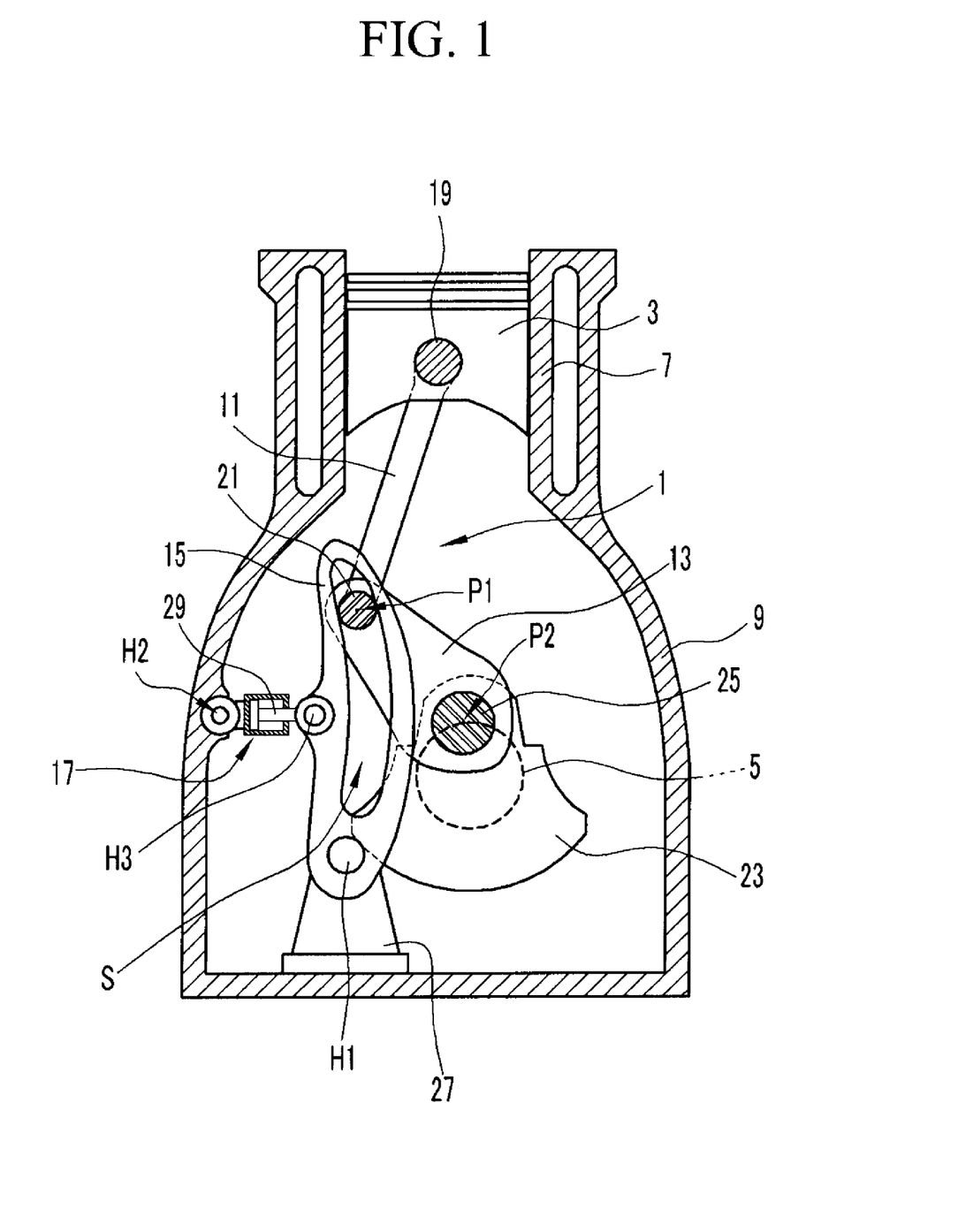
FIG. 1 is a schematic diagram showing the crankcase of an engine in which an exemplary variable compression ratio apparatus according to the present invention is applied.

FIG. 1 is a schematic diagram showing the crankcase of an engine in which an exemplary variable compression ratio apparatus according to the present invention is applied.

As shown in FIG. 1, the exemplary variable compression ratio apparatus 1 according to the present invention is configured in an engine that receives an explosion force of a mixed gas from a piston 3 to rotate a crankshaft 5 to vary the compression ratio of the mixed gas.

The piston 3 reciprocates inside a cylinder 7, and a combustion chamber is formed between the piston 3, the cylinder 7, and a cylinder head.

The crankshaft 5 receives the explosion force from the piston 3 to change the explosion force to a rotation torque and transfers it to a transmission. The crankshaft 5 is configured inside a crankcase 9 that is formed below the cylinder 7.

The variable compression ratio apparatus 1 includes a connecting rod 11, a pin link 13, a slot link 15, and a hydraulic pressure cylinder 17 as a driving unit to be configured inside the crankcase 9.

Ends of the connecting rod 11 are respectively connected to the piston 3 and the pin link 13 so as to receive the explosion force from the piston 3 to transfer it to the pin link 13.

That is, one end of the connecting rod 11 is rotatably connected to the piston 3 by a piston pin 19, and the other end thereof is rotatably connected to the pin link 13 by a connection pin 21 to from a connection portion P1.

One end of the pin link 13 is connected to the connecting rod to receive the explosion force from the connecting rod 11, and the other end thereof is rotatably connected to an opposite side of the weight and eccentric with respect to the center of the crankshaft 5 to form a rotation point P2.

Further, the lower end of the slot link 15 is fixed to one side of the lower portion of the crankcase 9 by a hinge block 27 and a hinge Hi, and a control slot (S) is formed along the length direction thereof to guide the connecting pin 21 that connects the connecting rod 11 with the pin link 13.

That is, the control slot (S) has an arc shape having a predetermined curvature and guides the movement of the connecting pin 21 to change the moving track of the pin link 13, and simultaneously changes the stroke of the piston 3 through the connecting rod 11 to vary the compression ratio of the mixed gas.

That is, in the driving unit, the hydraulic pressure cylinder 17 is configured between the slot link 15 and the crankcase 9 to vary the position of the control slot (S).

That is, the rear end of the hydraulic pressure cylinder 17 is fixed to one side inner surface of the crankcase 9 by a hinge H2, the front end of the operating rod 29 is fixed to the other side of the slot link 15 by a hinge H3, and the slot link 15 rotates based on the hinge HI point corresponding to the operation of the hydraulic pressure cylinder 17 to vary the position of the control slot (S).

Accordingly, the variable compression ratio apparatus 1 rotates the control slot (S) of the slot link 15 according to operation of the driving unit and the hydraulic pressure cylinder 17 that variably guides the movement of the connecting pin 21 and the pin link 13 such that the stroke of the piston 3 that is connected thereto through the connecting rod 13 can be changed to vary the compression ratio of the mixed gas.

The rotation angle of the above slot link 15 based on the hinge H1 point can be predetermined by a person of ordinary skill in this art at their discretion according to the necessary performance of the engine.

Figure 2:
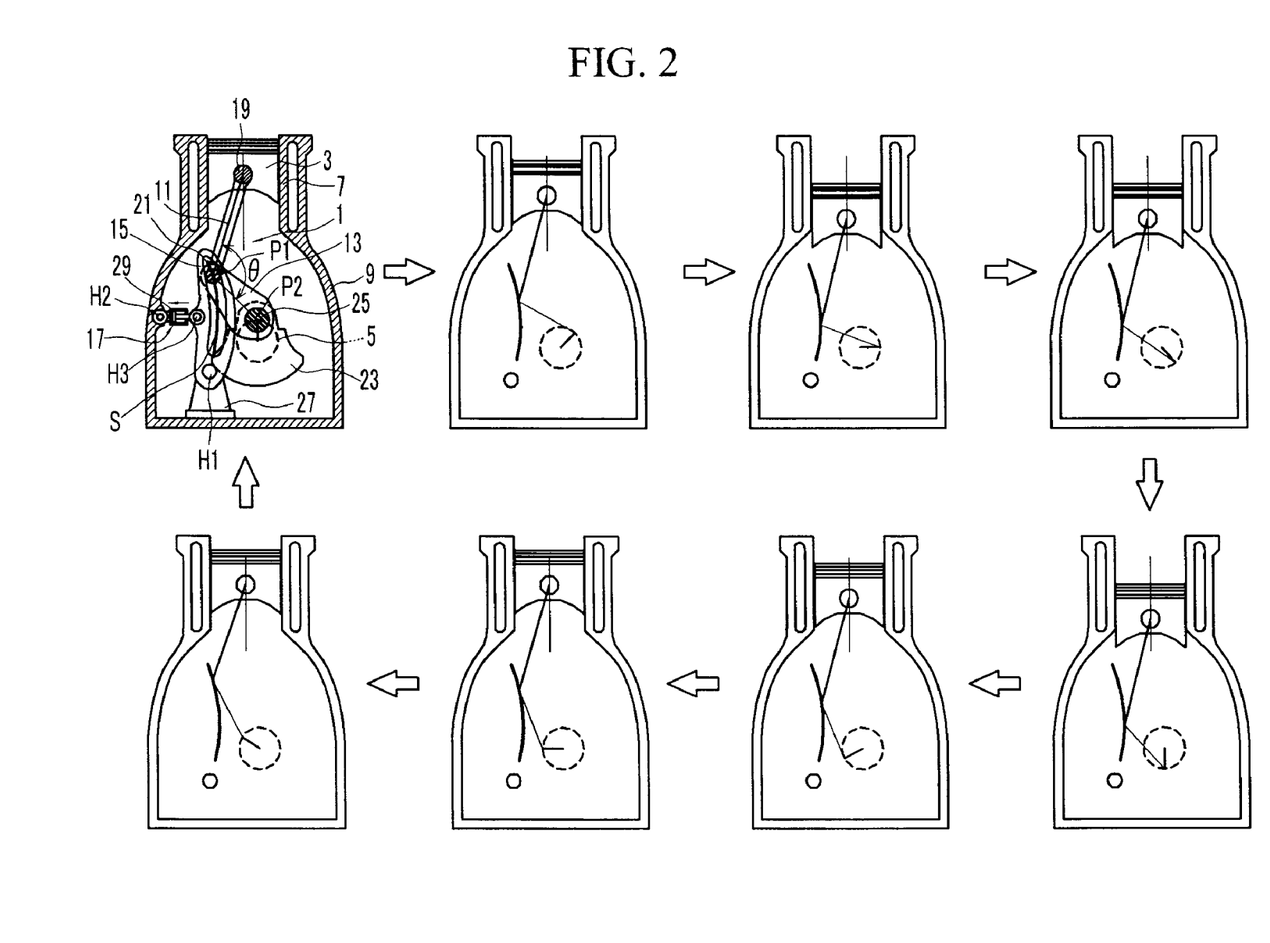
FIG. 2 is phased operation chart of an exemplary variable compression ratio apparatus according to the present invention in a low compression ratio condition.
Figure 3:
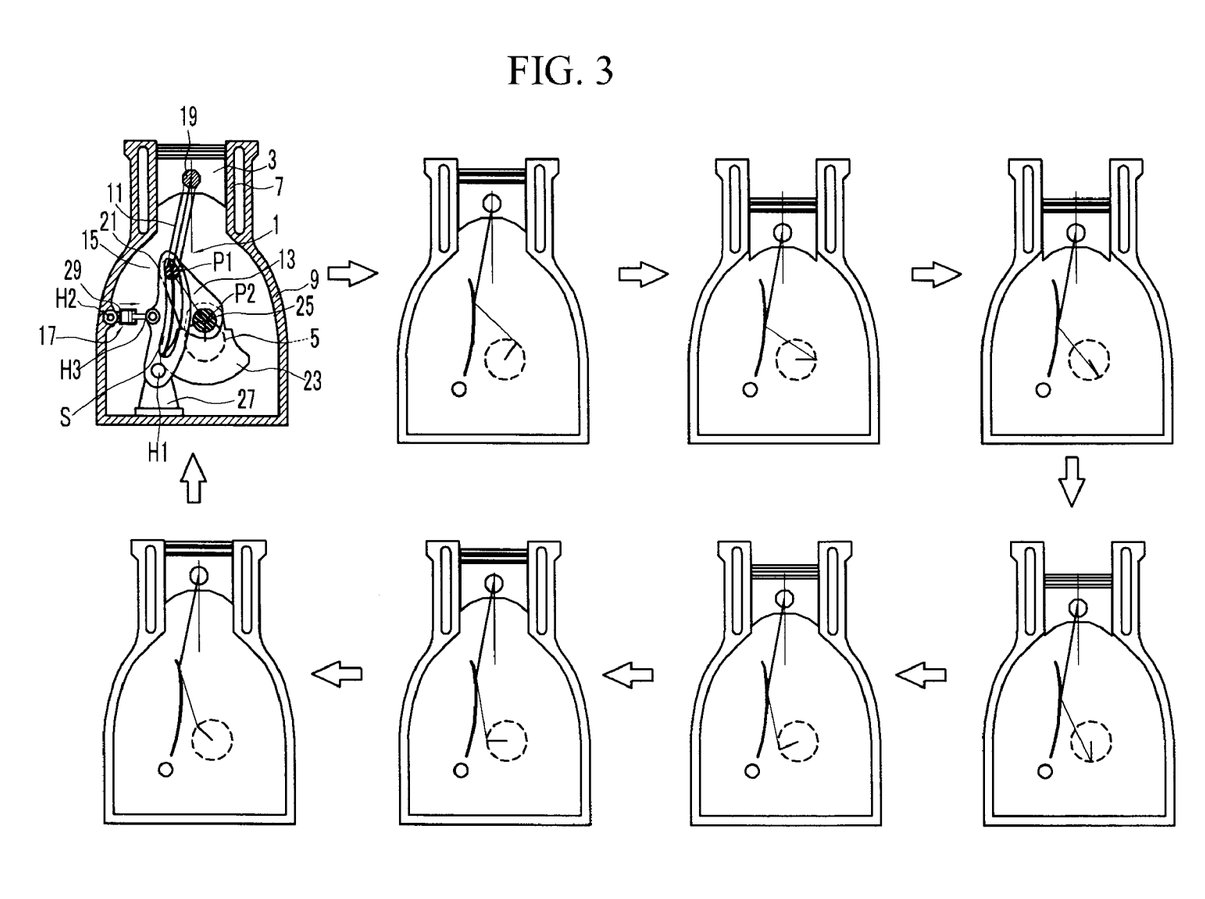
FIG. 3 is phased operation chart of an exemplary variable compression ratio apparatus according to the present invention in a high compression ratio condition.

FIG. 2 is phased operation chart of the present exemplary variable compression ratio apparatus according to the present invention in a low compression ratio condition, and FIG. 3 is phased operation chart of the present exemplary variable compression ratio apparatus according to the present invention in a high compression ratio condition.

That is, as shown in FIG. 2 and FIG. 3, the slot link 15 is rotated corresponding to low and high compression ratios such that the phased crossing angle (0) between the connecting rod 11 and the pin link 13 is differently achieved to vary the compression ratio of the mixed gas and the stroke of the piston 3.

Figure 4:
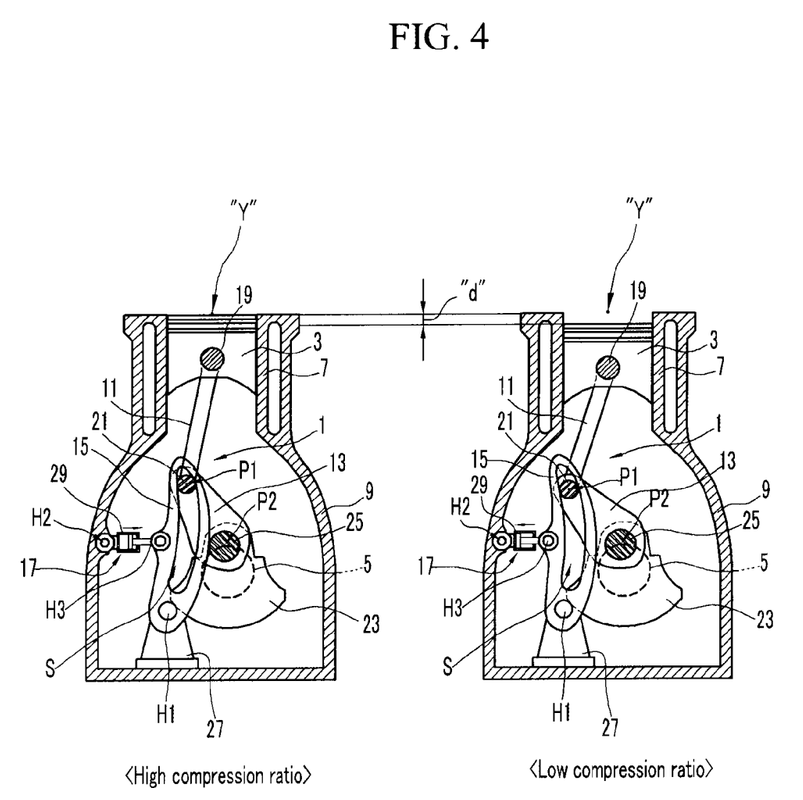
FIG. 4 is a diagram showing a position change of top dead center of a piston according to the position change of a slot link in an exemplary variable compression ratio apparatus according to the present invention.

The compression ratio variation of the mixed gas in the present exemplary variable compression ratio apparatus according to the present invention is detailed through the diagram of FIG. 4 that shows the position change of top dead center of the piston 3 according to the position variation of the slot link 15.

"Y" of FIG. 4 denotes top dead center (TDC) of the piston 3 in a case in which the mixed gas is maximally compressed.

As shown in FIG. 4, when the slot link 15 rotates in an anticlockwise direction, the compression ratio decreases to the low state such that the top dead center of the piston 3 is lowered from the base position. That is, "d" represents the distance between the base position and the low compression ratio position of top dead center as the slot link 15 rotates for the control slot (S) to move forward and the distance "d" increases such that the compression ratio decreases.

Accordingly, the exemplary variable compression ratio apparatus according to the present invention has a simple structure and varies the compression ratio of the mixed gas according to the driving conditions of the engine such that the output and fuel consumption efficiency can be improved.

Figure 5:
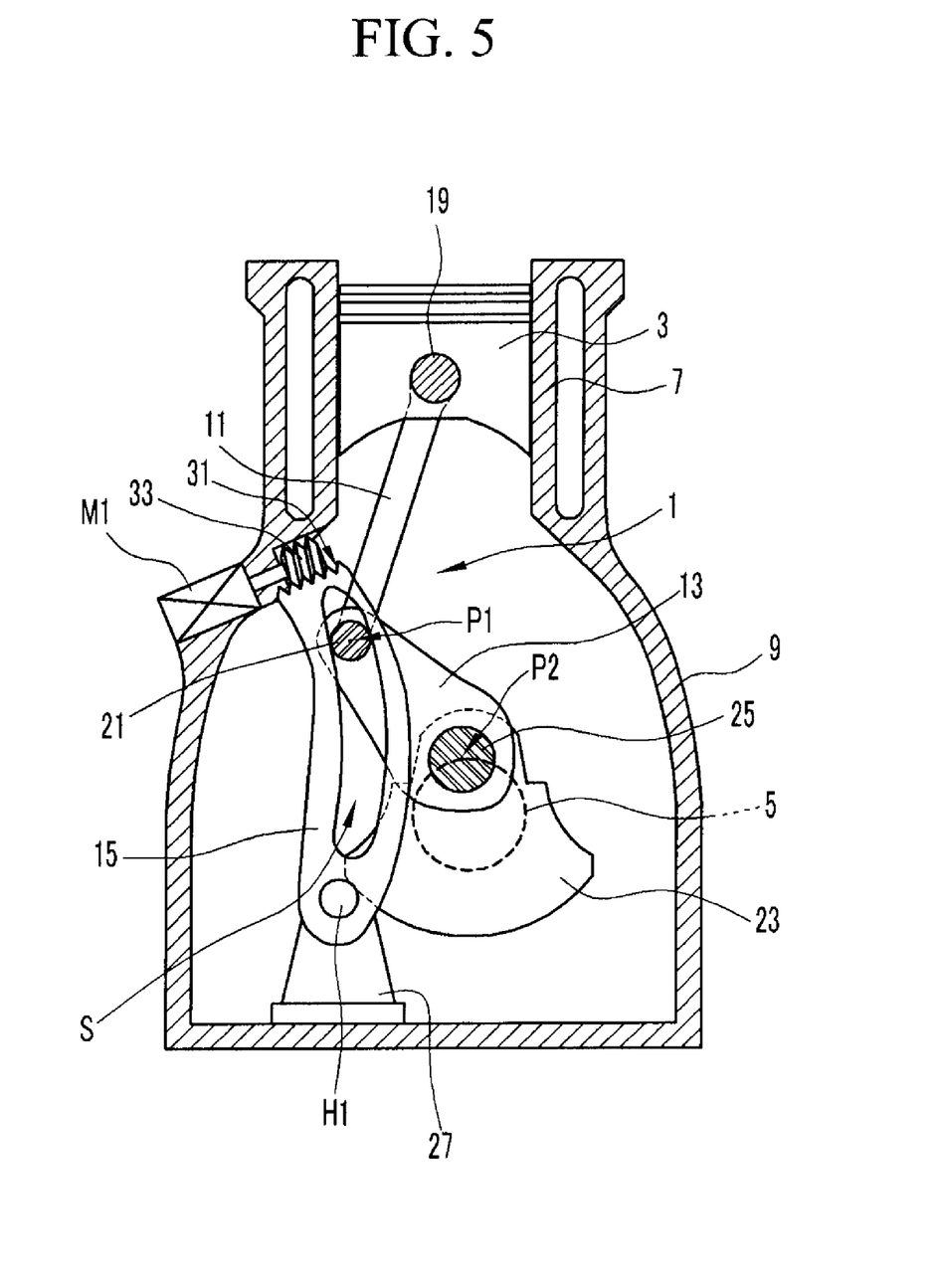
FIG. 5 is a schematic diagram showing the crankcase of an engine in which an exemplary variable compression ratio apparatus according the present invention is applied.

FIG. 5 is a schematic diagram showing the crankcase of an engine in which an exemplary variable compression ratio apparatus according to the present invention is applied.

As shown in FIG. 5, the exemplary variable compression ratio apparatus 1 according to the present invention has basically the same constituent elements as the first variable compression ratio apparatus, i.e., a connecting rod 11, a pin link 13, a slot link 15, and a driving unit, and connection relationships thereof are identical.

However, in the variable compression ratio apparatus 1 according to the present exemplary embodiment, a hinge block 27 is fixed to the lower side of the crankcase 9 and a slot link 15 is connected to a hinge H1 of the hinge block 27, and there is a difference in that a rack portion 31 is formed in the upper end of the slot link 15.

Also, the driving unit according to the present exemplary embodiment includes a motor M1 that is mounted on the inner surface of the crankcase 9, and a pinion 33 is disposed on the rotation shaft of the motor M1 to be engaged with the rack portion 31.

That is, there is a difference in that the slot link 15 is rotated by the motor M through the rack portion 31 that is engaged with the pinion 33.

Further, in the variable compression ratio apparatus 1 according to the present exemplary embodiment, the compression ratio of the mixed gas is varied by the same principle as in the first exemplary embodiment, and therefore the detailed description thereof will be omitted.

Figure 6:
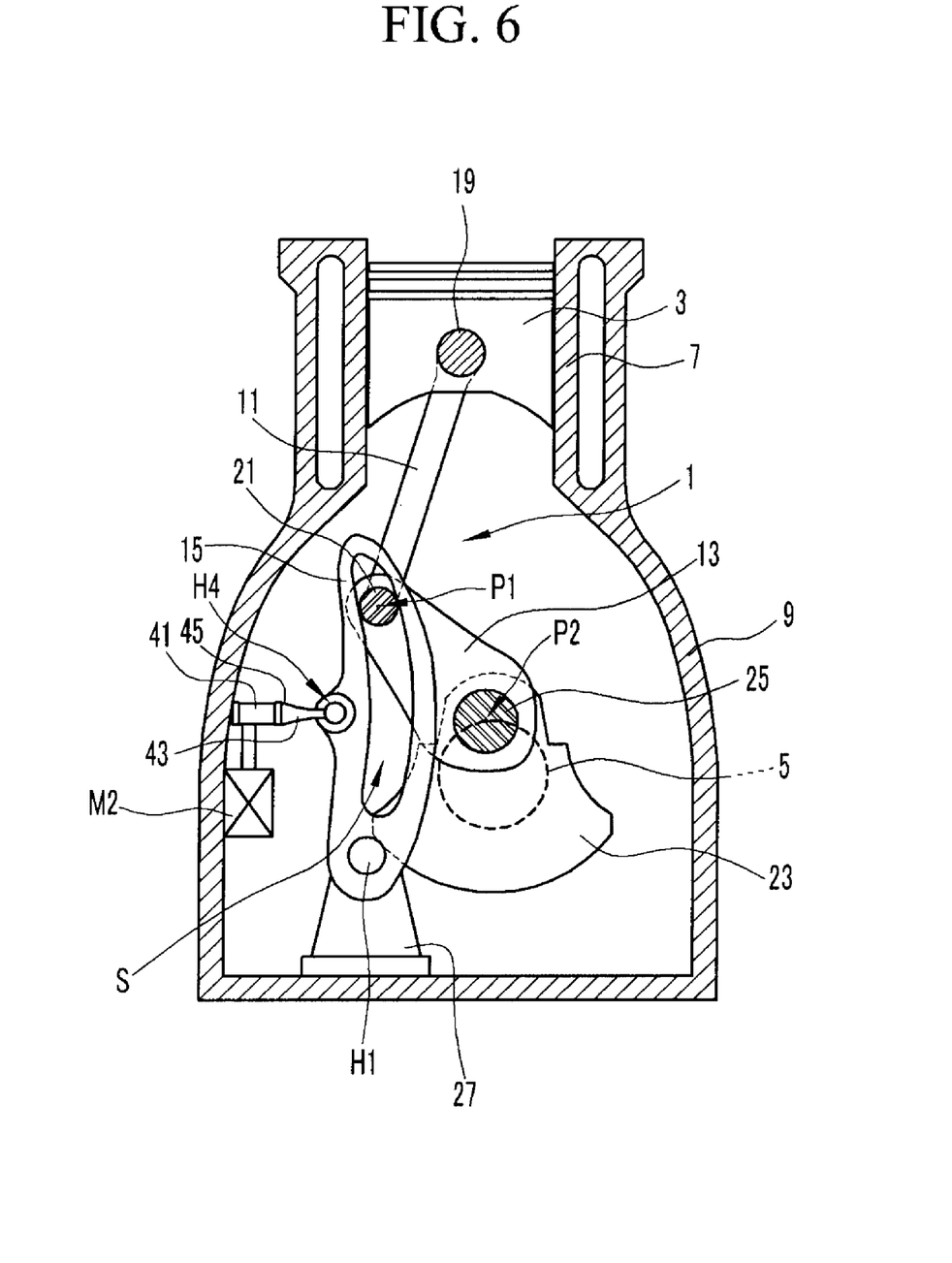
FIG. 6 is a schematic diagram showing the crankcase of an engine in which an exemplary variable compression ratio apparatus according to the present invention is applied.

FIG. 6 is a schematic diagram showing the crankcase of an engine in which an exemplary variable compression ratio apparatus according to the present invention is applied.

As shown in FIG. 6, the exemplary variable compression ratio apparatus 1 according to the present invention has basically the same constituent elements as the first variable compression ratio apparatus, i.e., a connecting rod 11, a pin link 13, a slot link 15, and connection relationships thereof are identical.

However, the present exemplary variable compression ratio apparatus 1 has a difference in the driving unit.

That is, a driving unit according to the present exemplary embodiment includes a motor M2 with an eccentric cam 41 is fixed on the rotation shaft thereof is mounted on the inner side of the crankcase, and a link 45 on which a cam ring 43 into which the eccentric cam 41 is inserted is formed in one end thereof and the other end thereof is hinged to the other side of the slot link 15 by a hinge H4.

Accordingly, there is a difference in that the eccentric cam 41 moves the link 45 as much as the eccentricity amount by the operation of the motor M2 to rotate the slot link 15.

Further, in the variable compression ratio apparatus 1 according to the present exemplary embodiment, the compression ratio of the mixed gas is varied by the same principle as in the first exemplary embodiment, and therefore the detailed description thereof will be omitted.

Figure 7:
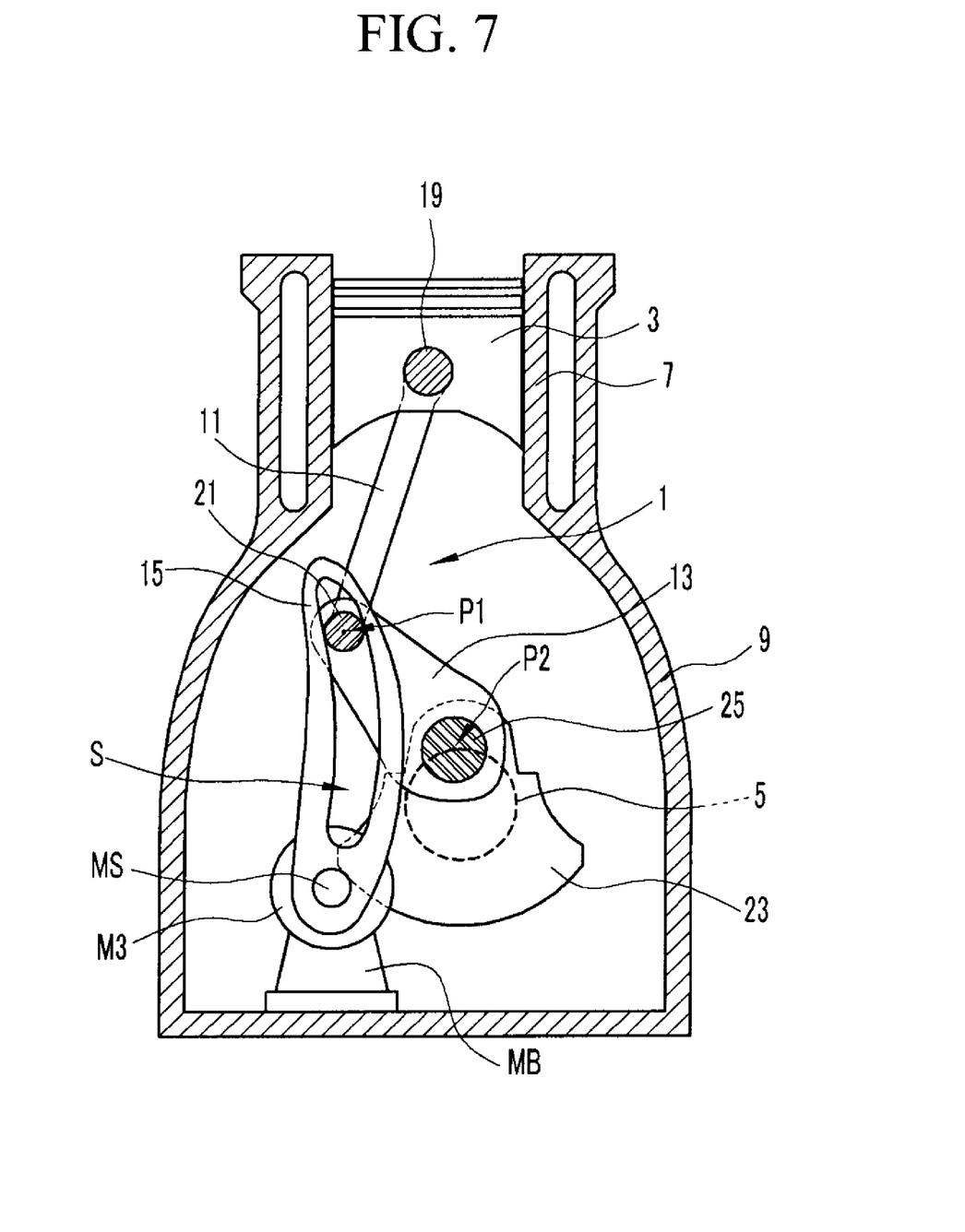
FIG. 7 is a schematic diagram showing the crankcase of an engine in which an exemplary variable compression ratio apparatus according to the present invention is applied.

FIG. 7 is a schematic diagram showing the crankcase of an engine in which an exemplary variable compression ratio apparatus according to the present invention.

As shown in FIG. 7, the exemplary variable compression ratio apparatus according to the present invention 1 has basically the same constituent elements as the first variable compression ratio apparatus, i.e., a connecting rod 11, a pin link 13, a slot link 15, and a driving unit, and connection relationships thereof are identical.

However, the present exemplary variable compression ratio apparatus 1 includes the slot link 15 that is configured on the lower side of the crankcase 9 through the driving unit.

That is, the driving unit according to the present exemplary embodiment includes a motor M3 that is mounted on the inner side of the crankcase 9 by a motor bracket (MB), and the lower end of the slot link 15 is fixed to the rotation shaft (MS) of the motor M3.

Accordingly, there is a difference that in the driving unit, the motor M3 rotates the rotation shaft (MS) to rotate the slot link 15.

Further, in the variable compression ratio apparatus 1 according to the fourth exemplary embodiment, the compression ratio of the mixed gas is varied by the same principle as in the first exemplary embodiment, and therefore the detailed description thereof will be omitted.

Figure 8:
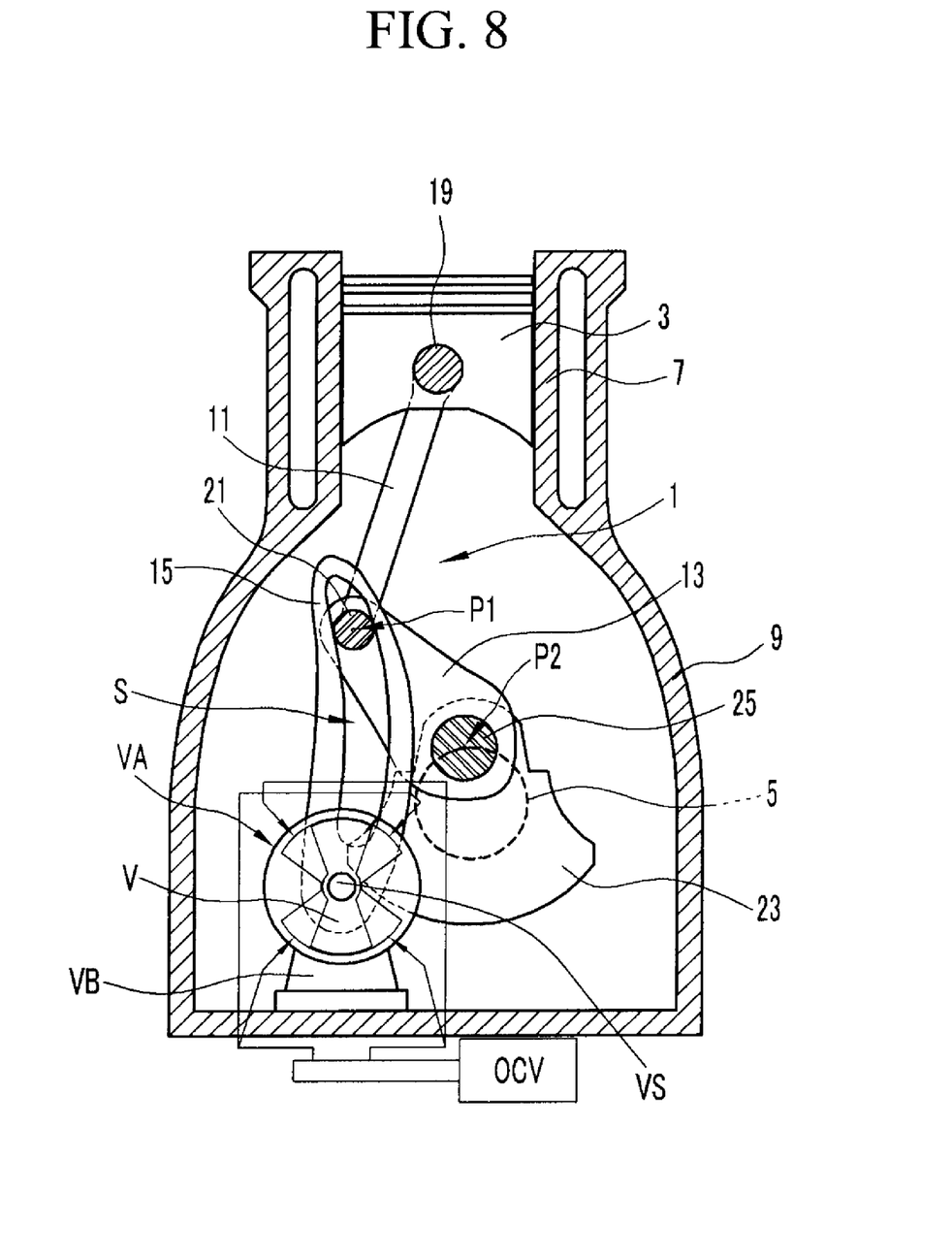
FIG. 8 is a schematic diagram showing the crankcase of an engine in which an exemplary variable compression ratio apparatus according to the present invention is applied.

FIG. 8 is a schematic diagram showing the crankcase of an engine in which an exemplary variable compression ratio apparatus according to the present invention is applied.

As shown in FIG. 8, the exemplary variable compression ratio apparatus 1 according to the present invention has basically the same constituent elements as the first variable compression ratio apparatus, i.e., a connecting rod 11, a pin link 13, a slot link 15, and a driving unit, and connection relationships thereof are identical.

However, there is a difference in that a variable compression ratio apparatus 1 according to the present exemplary embodiment includes a slot link 15 that is mounted on the inner side of the crankcase 9 through the driving unit.

That is, the driving unit according to the present exemplary embodiment includes a vane type of hydraulic pressure actuator (VA) that is mounted on the inner side of the crankcase 9 through a valve bracket (VB).

The vane type of hydraulic pressure actuator (VA) receives hydraulic pressure from an oil control valve (OCV), which is configured outside, to rotate the center shaft (VS) that is connected to the vane (V), and the lower end of the slot link 15 is fixed to the center shaft (VS).

Accordingly, in the driving unit, a vane type of hydraulic pressure actuator (VA) is operated to rotate the slot link 15 as much as the rotation angle of the center shaft (VS) thereof.

Further, in the variable compression ratio apparatus 1 according to the present exemplary embodiment, the compression ratio of the mixed gas is varied by the same principle as in the first exemplary embodiment, and therefore the detailed description thereof will be omitted.

Figure 9:
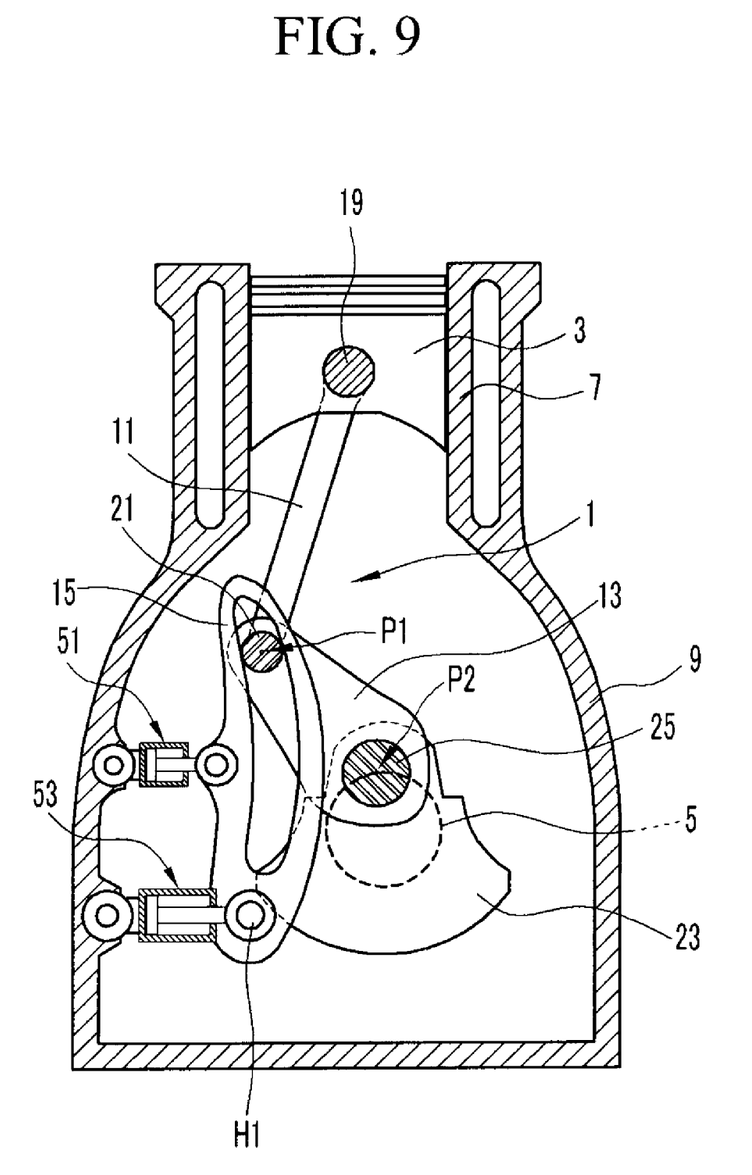
FIG. 9 is a schematic diagram showing the crankcase of an engine in which an exemplary variable compression ratio apparatus according to the present invention is applied.

FIG. 9 is a schematic diagram showing the crankcase of an engine in which an exemplary variable compression ratio apparatus according to the present invention is applied.

As shown in FIG. 9, the exemplary variable compression ratio apparatus according to the present invention 1 has basically the same constituent elements as the first variable compression ratio apparatus, i.e., a connecting rod 11, a pin link 13, a slot link 15, and a driving unit according to the first exemplary embodiment, and connection relationships thereof are identical.

However, a variable compression ratio apparatus 1 according to the present exemplary embodiment includes a slot link 15 that is mounted on the upper and lower sides of the inner part of the crankcase 9 through a driving unit.

That is, the driving unit according to the present exemplary embodiment includes two hydraulic pressure cylinders 51 and 53 that are respectively mounted on the upper and lower sides inside the crankcase 9, and the hydraulic pressure cylinders 51 and 53 are respectively connected to the middle part and the lower part of the slot link 15 through the operating rods thereof.

That is, there is a difference that in the driving unit, the two hydraulic pressure cylinders 51 and 53 is respectively operated to move the position of the slot link 15.

Further, in the variable compression ratio apparatus 1 according to the present exemplary embodiment, the compression ratio of the mixed gas is varied by the same principle as in the first exemplary embodiment, and therefore the detailed description thereof will be omitted.

For convenience in explanation and accurate definition in the appended claims, the terms "upper", "lower", "front", "rear", "outside", "outwardly", and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable compression ratio apparatus for varying a compression ratio, comprising:
    a connecting rod that is pivotally connected to a piston to take a combustion force;
    a pin link, one end of which is eccentrically connected to a crankshaft and the other end of which is pivotally connected to the connecting rod to form a connection portion therebetween;
    a slot link including a control slot to receive and guide the connection portion along the control slot; and
    a driving unit coupled to the slot link and configured to move the control slot to control a position of the connection portion.

2. The variable compression ratio apparatus of claim 1, wherein the control slot has an arc shape of a predetermined curvature.

3. The variable compression ratio apparatus of claim 1, wherein the driving unit includes a hydraulic pressure cylinder to receive an operating rod therein, one side of the slot link being pivotally fixed to the crankcase, a rear end of the hydraulic pressure cylinder being pivotally fixed to the crankcase, and a front end of the operating rod being pivotally connected to the other side of the slot link.

4. The variable compression ratio apparatus of claim 1, wherein the driving unit includes:
    a motor mounted to the crankshaft; and
    a pinion being connected to a rotation shaft of the motor, wherein one side of the slot link is pivotally connected to the crankcase and a rack portion is formed in the other side of the slot link such that the pinion is engaged with the rack portion of the slot link.

5. The variable compression ratio apparatus of claim 1, wherein the driving unit includes:
    a motor being mounted in the crankcase;
    an eccentric cam being mounted to a rotation shaft of the motor; and
    a link, wherein a cam ring, through which the eccentric cam is inserted, is configured on one end of the link and the other end of the link is pivotally connected to one side of the slot link and the other side of the slot link is pivotally connected to the crankcase.

6. The variable compression ratio apparatus of claim 1, wherein the driving unit includes a motor that is mounted in the crankcase and one side of the slot link being fixed to a rotation shaft of the motor.

7. The variable compression ratio apparatus of claim 1, wherein the driving unit includes a vane type of a hydraulic pressure actuator, and one side of the slot link is fixed to a center shaft of the hydraulic pressure actuator and is provided with hydraulic pressure to rotate the slot link at a predetermined angle.

8. The variable compression ratio apparatus of claim 1, wherein the driving unit includes two hydraulic pressure cylinders having operating rods respectively, rear ends of which are pivotally connected to one portion and the other portion of the crank case respectively, and front ends of each operating rod are pivotally connected to one portion and the other portion of the slot link respectively.

9. A variable compression ratio apparatus that is disposed in a crankcase of an engine to be provided with an explosion force of a mixed gas from a piston so as to rotate a crankshaft and that varies a compression ratio of the mixed gas, comprising:
    a connecting rod of which one end thereof is rotatably connected to the piston;
    a pin link that includes one end connection portion that is rotatably connected to the other end of the connecting rod and a connection portion of the other end that is connected to a point that is eccentric with respect to a rotation center of the crankshaft;
    a slot link of which one side thereof is fixed to the crankcase by a hinge and a control slot is formed to guide the one end connection portion of the connecting rod and the pin link in a length direction thereof; and
    a driving unit that is connected to the other side of the slot link to vary a position of the control slot through a hinge structure of the slot link.

10. The variable compression ratio apparatus of claim 9, wherein the control slot has an arc shape of a predetermined curvature.

11. The variable compression ratio apparatus of claim 9, wherein the driving unit includes a hydraulic pressure cylinder of which a rear end thereof is connected to the other side of the crankcase by a hinge and a front end of the operating rod thereof is connected to the other side of the slot link by a hinge.

12. The variable compression ratio apparatus of claim 9, wherein the driving unit includes a motor that is equipped with a pinion, which is mounted on a rotation shaft thereof to be engaged with a rack portion that is formed in the other side of the slot link.

13. The variable compression ratio apparatus of claim 9, wherein the driving unit includes a motor that is disposed in the other side of the crankcase and an eccentric cam is mounted on a rotation shaft thereof, and a link with a cam ring, through which the eccentric cam is inserted, is formed at one end thereof and the other end thereof is connected to the other side of the slot link.

14. A variable compression ratio apparatus that is disposed in a crankcase of an engine to be provided with an explosion force of a mixed gas from a piston so as to rotate a crankshaft and that varies a compression ratio of the mixed gas, comprising:

a connecting rod of which one end thereof is rotatably connected to the piston inside the crankcase;

a pin link that includes one end connection portion that is rotatably connected to the other end of the connecting rod and a connection portion of the other end that is connected to a point that is eccentric with respect to a rotation center of the crankshaft;

a slot link in which a control slot is formed to guide the one end connection portion of the connecting rod and the pin link in a length direction thereof; and a driving unit that is configured in one side of the crankcase to connect to one side of the slot link such that the slot link can be rotated to vary a position of the control slot.

15. The variable compression ratio apparatus of claim 14, wherein the control slot has an arc shape of a predetermined curvature.

16. The variable compression ratio apparatus of claim 14, wherein the driving unit, which is mounted in one side inside the crankcase by a motor bracket, includes a motor of which a rotation shaft thereof is fixed to one side of the slot link.

17. The variable compression ratio apparatus of claim 14, wherein the driving unit, which is mounted on one side inside the crankcase by a valve bracket, includes a vane type of hydraulic pressure actuator of which a center shaft thereof is fixed to one side of the slot link to be provided with hydraulic pressure to rotate the slot link at a predetermined angle.

18. A variable compression ratio apparatus that is disposed in a crankcase of an engine to be provided with an explosion force of a mixed gas from a piston so as to rotate a crankshaft and varies a compression ratio of the mixed gas, comprising:

a connecting rod of which one end thereof is rotatably connected to the piston in the crankcase;

a pin link that includes one end connection portion that is rotatably connected to the other end of the connecting rod and a connection rotation point of the other end that is connected to a point that is eccentric with respect to a rotation center of the crankshaft;

a slot link of which a control slot is formed to guide the one end connection portion of the connecting rod and the pin link in a length direction thereof; and a driving unit that is configured at one side and the other side of the crankcase to be respectively connected to one side and the other side of the slot link such that a position of the slot link is changed to vary a position of the control slot.

19. The variable compression ratio apparatus of claim 18, wherein the control slot has an arc shape of a predetermined curvature.

20. The variable compression ratio apparatus of claim 18, wherein the driving unit includes two hydraulic pressure cylinders of which rear ends thereof are respectively connected to one side and the other side of the crankcase by hinges and front ends of each of operating rods thereof are respectively connected to one side and the other side of the slot link by hinges.

* * * * *